United States Patent
Cripe

[19]

[11] Patent Number: 6,118,283
[45] Date of Patent: Sep. 12, 2000

[54] CAPACITIVE ROTARY POSITION SENSOR

[75] Inventor: David W. Cripe, Camp Point, Ill.

[73] Assignee: Methode Electronics, Inc., Chicago, Ill.

[21] Appl. No.: 08/953,886

[22] Filed: Oct. 20, 1997

[51] Int. Cl.[7] .............................. G01B 7/30; G01R 27/26; G05B 1/06
[52] U.S. Cl. ............................................ 324/660; 324/686
[58] Field of Search ...................................... 324/660, 658, 324/686, 690

[56] References Cited

U.S. PATENT DOCUMENTS

| | | | |
|---|---|---|---|
| 4,238,781 | 12/1980 | Vercellotti et al. | 324/660 |
| 4,755,731 | 7/1988 | Anthony et al. | 324/660 X |
| 4,879,552 | 11/1989 | Arai et al. | 340/870.37 |
| 5,028,875 | 7/1991 | Peters | 324/660 |
| 5,598,153 | 1/1997 | Brasseur et al. | 324/660 X |
| 5,736,865 | 4/1998 | Nelson et al. | 324/660 |

*Primary Examiner*—Glenn W. Brown
*Attorney, Agent, or Firm*—Steven M. Evans; David L. Newman

[57] ABSTRACT

A capacitive rotary position sensor is provided. The rotary positions sensor includes a housing, a stator, and a rotor. The stator is formed of a disc shaped piece of insulating material including a plurality of conductive plates formed in a circular pattern on the surface of the disc. Similarly, the rotor is formed as a second disc of insulating material having a single conductive plate formed on the surface thereof. A signal generator provides a polyphase signal for driving each of the conductive plates formed on the rotor with an individual component of the polyphase signal. The stator and rotor are placed in parallel to the stator disc, and the plurality of conductive plates on the stator face the single conductive plate formed on the rotor. A thin dielectric coating applied to the rotor plate prevents the rotor conductive plate from shorting the adjacent stator conductive plates. An input shaft is attached to the rotor such that rotary motion of the input shaft alters the position of the single conductive plate relative to each of the first plurality of conductive plates. The parallel spaced rotor and stator conductive plates form a variable capacitance through which the component signals of the input polyphase signal can be capacitively coupled between the stator and rotor conductive plates. A phase detector is provided for determining the phase relationship between the components of the polyphase signal driving the stator conductive plates and an intermediate signal capacitively coupled between the stator conductive plates, and the rotor conductive plate.

23 Claims, 5 Drawing Sheets

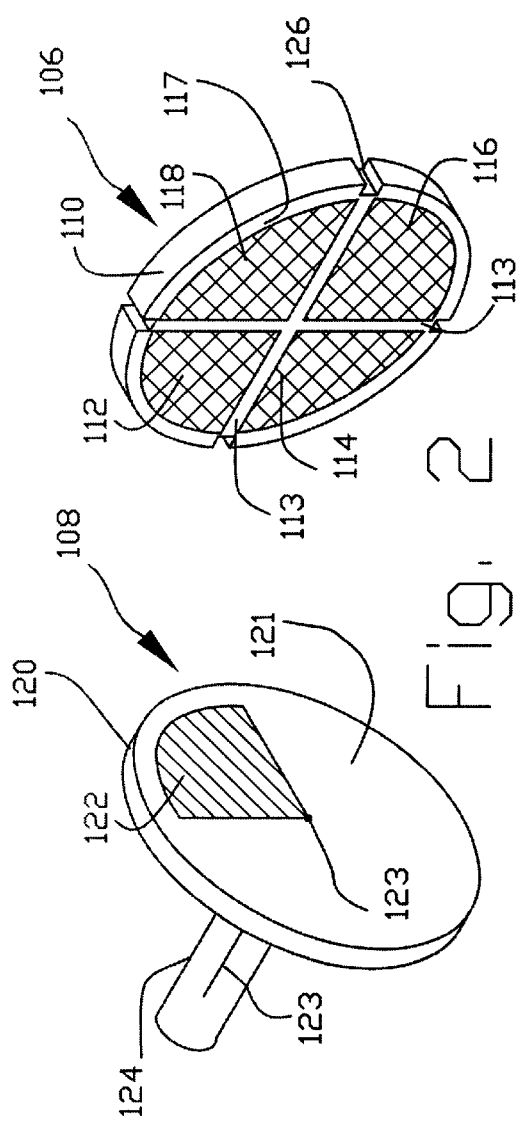
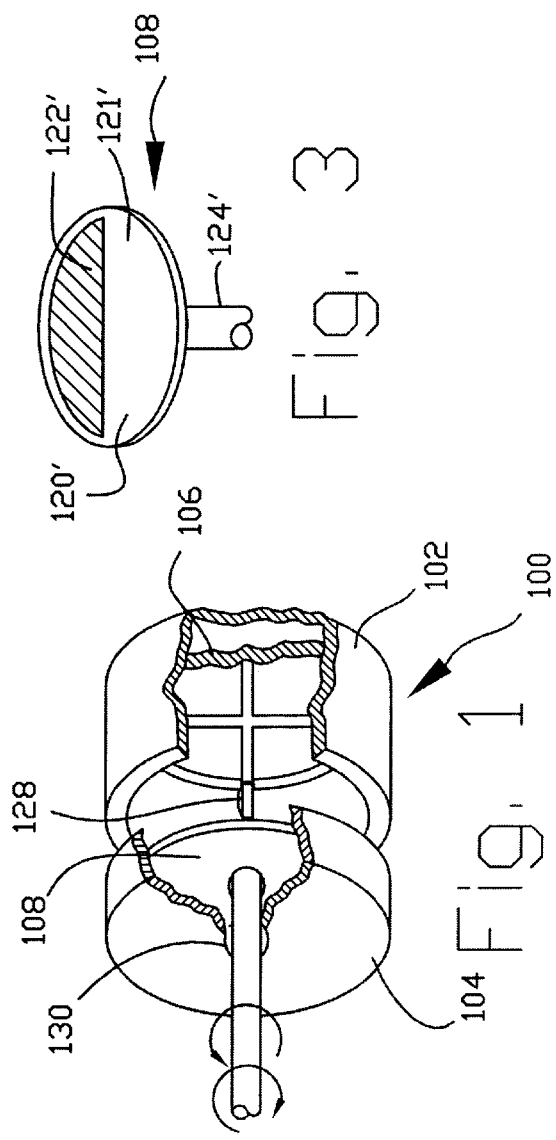

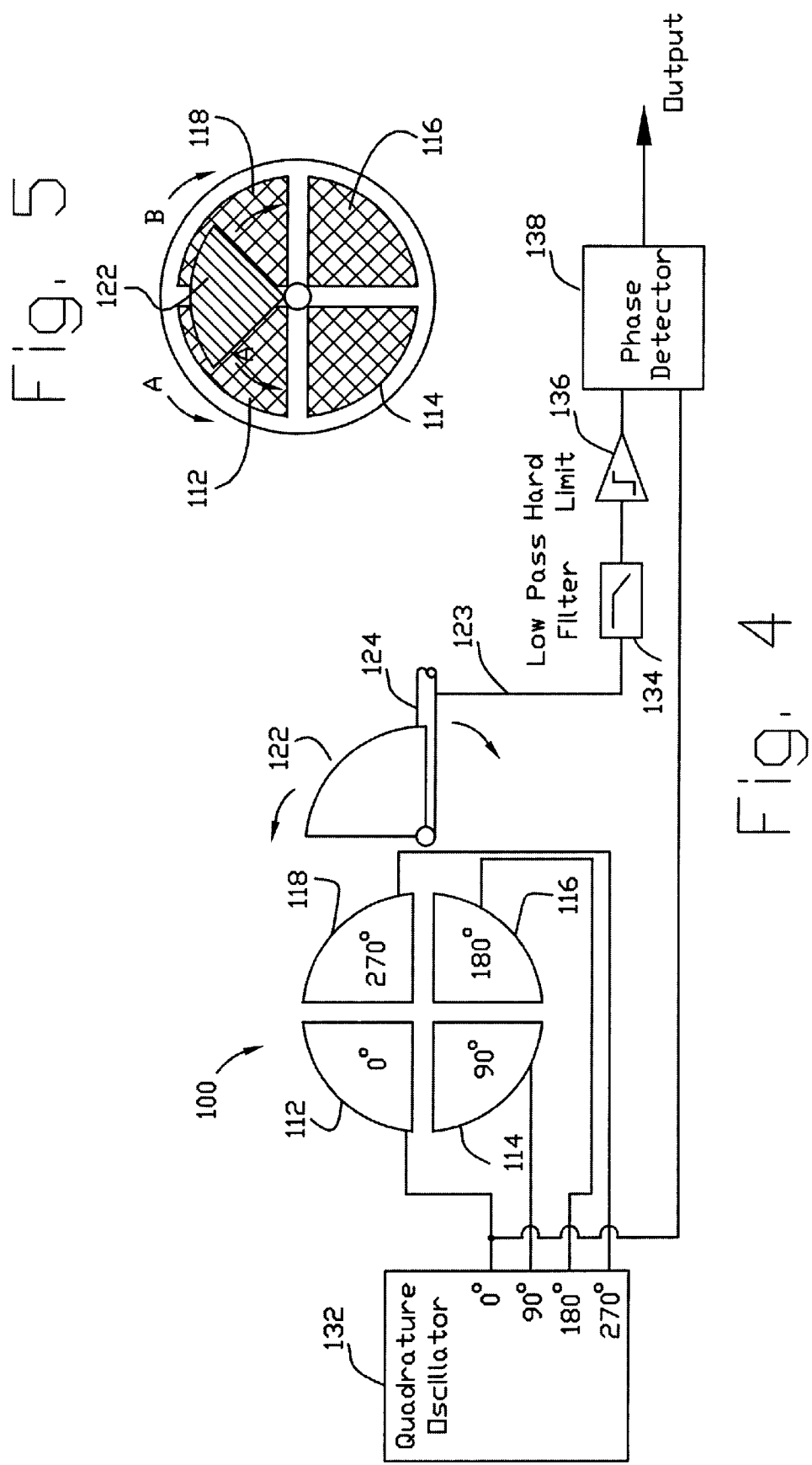

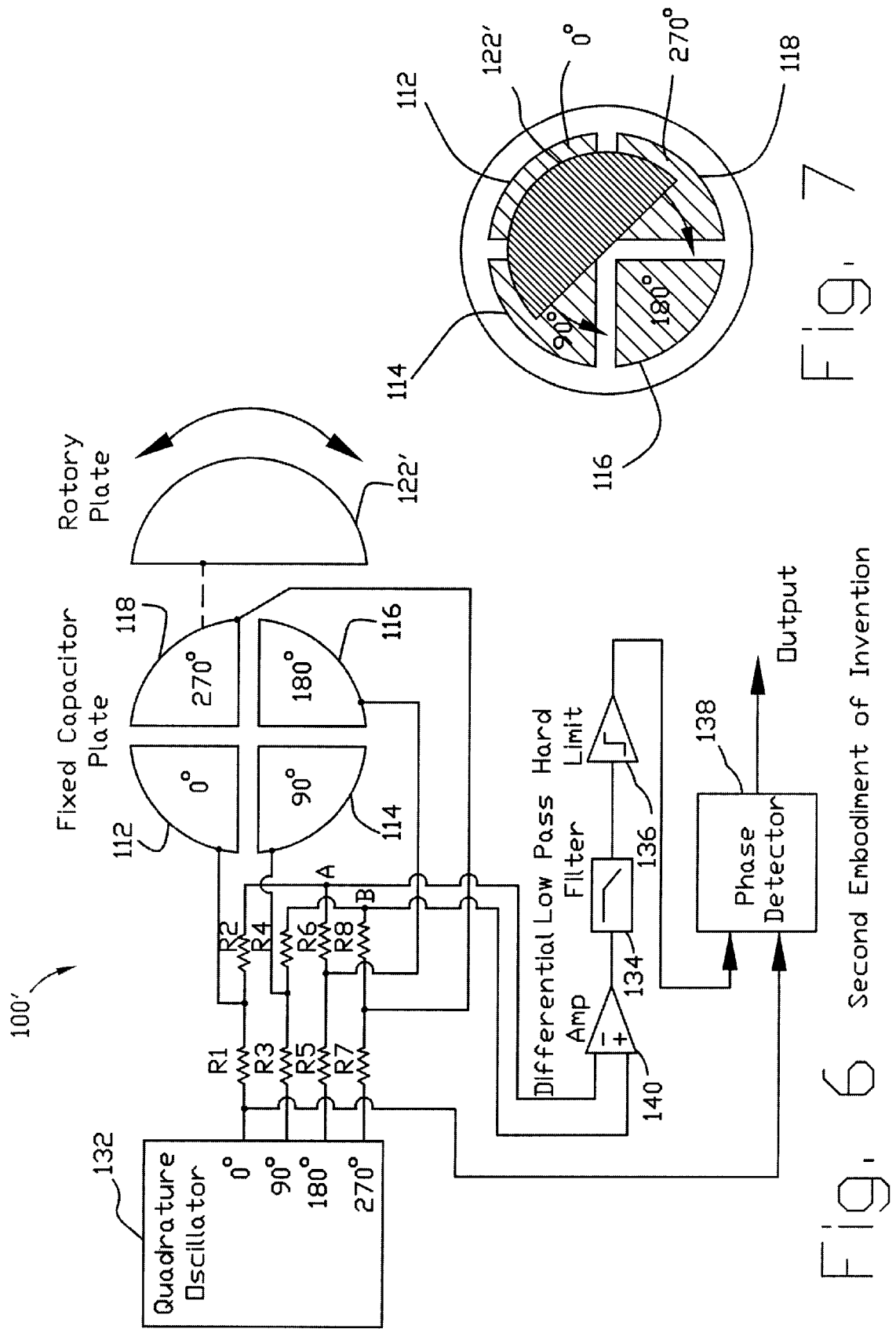

CAPACITIVE ROTARY POSITION SENSOR

BACKGROUND OF THE INVENTION

The present invention provides an improved rotary position sensor for monitoring the angular position of a rotating shaft.

In mechanical systems, motion is often initiated and controlled by rotating a member such as a shaft. The angular motion of the shaft is then translated into some other motion, such linear displacement, rotation of a pump or fan, or the angular rotation of some other intermediate part at a different angular velocity or spatial orientation. Numerous mechanical means such as gears, cams, pulleys, and belts are commonly employed in translating the angular motion of an input shaft to drive an output device. One simple example is that of an automotive rack and pinion steering system. In a simplified steering system, the input shaft comprises the rotating steering column driven by the manual input of a human operator turning the steering wheel. As the steering wheel is turned, the steering column rotates, driving a pinion attached to the end of the shaft. The pinion meshes with a rack which is pulled from side to side in a linear motion directed perpendicular to the steering column. Tie rods attached to the rack connect to the front wheel hubs, and as the rack moves back and forth the tie rods push and pull on the front wheel hubs, turning the front wheels in response to the rotation of the steering wheel. While most modern power steering systems are much more complex than the skeletal system just described, the above example illustrates a simple mechanical system wherein the angular rotation of an input shaft (the steering column) is translated into a completely different motion (rotation of the front wheels of the car). What should also be clear from the above example, is that the amount of angular displacement of the front wheels is entirely dependent on the angular displacement of the steering column.

Often it is desirable to monitor the position of various mechanical parts within a mechanical system. However, in many cases due to space restrictions or other physical characteristics, it is inconvenient or impossible to directly monitor the position of a particular part. In such cases it is often easier to monitor the position of the part indirectly. For example, in the steering mechanism described above, measuring the angular position of the front wheels directly would be a difficult and expensive proposition, but because of the rigid mechanical link between the steering column, the pinion, the rack, the tie rods and the wheels, the output position of the wheels can be accurately determined by monitoring the angular position of the steering column. Thus, by supplying a rotary position sensor on the steering column of an automobile it is possible to generate an electrical signal which indicates the angular position of the front wheels.

This relationship between the angular position of a rotating input shaft and the position of an output or intermediate mechanical member is ubiquitous throughout the mechanical arts. In some applications, such as servo motors, a position sensor is mounted directly to the output shaft of a motor, and the output position and/or speed of the machine can be readily determined by monitoring the rotation of the motor. In any mechanical system wherein the output position of a mechanical part is to be determined by the position of a rotating input shaft, a key element is the rotary position sensor. The rotary position sensor must accurately and reliably determine the angular position of the input shaft before that information can be extrapolated into the position of the output member. In addition to accuracy and reliability issues, each specific application will provide its own demands and limitations on the design of the rotary position sensor. For example, in the steering system described above, the steering wheel may be rotated several times in turning the front wheels from their maximum left turn position to their maximum right turn position. Thus, a rotary position sensor for this system must function over a number of turns of the input shaft. The sensor must be able to determine not only the angular position of the steering wheel, but also the position of the wheel within its full turning range. In other systems it may only be necessary to sense rotation over a single turn. In still other applications, physical constraints may make it difficult to couple electrical signals to the rotating portion of the sensor. And finally, the cost of various position sensors may be an overriding factor in determining the best sensor for a particular application.

Some rotary position sensors currently in use include rotary potentiometers, inductive position resolvers, and optical encoders. Each of these devices have their own characteristic advantages and disadvantages, which make them more suitable for some applications rather than others. Rotary potentiometers, for example supply a voltage signal proportional to the position of a wiper contact which rides along a resistive element. Initially, such rotary potentiometers are quite accurate and provide excellent position indication over a single turn of the input shaft. However, over time, the sliding motion of the wiper contact over the resistive element can lead to wear which alters the resistance ratio between the resistive element and the wiper contact, leading to inaccuracy in the output position signal. Rotary potentiometers are also subject to contamination of the contact elements which can adversely effect the accuracy of the device. For these reasons, rotary potentiometers are not well suited for those applications where extended long term reliability is required or where harsh environmental conditions are likely to adversely effect the sensor. Thus, a rotary potentiometer would be particularly unsuited for application in the steering mechanism described above. Because of the near constant back and forth motion of the steering wheel around the point where the front wheels are approximately straight, and the only occasional wider deviations during the execution of sharper turns, the resistive element within the rotary potentiometer will tend to wear unevenly so that the output position signal will no longer be linear over the entire range of the wiper contact.

Inductive position resolvers, on the other hand, have advantages over rotary potentiometers in that they are non-contact devices. Resolvers operate on inductive principles, having mutually coupled coils mounted to both a rotor and a stator. As the rotor coil rotates relative to the stator coil, the mutual inductance between the two coils changes such that a voltage signal impressed on the stator coil will be coupled to the rotor coil in varying strength depending on the angular relationship between the coils. While resolvers have obvious advantages over rotary potentiometers, a drawback is that they require signal connections to the rotating member. Therefore, slip rings or some other mechanism for connecting electrical signals to the rotating member are required. Also, resolvers are generally more expensive than rotary potentiometers and more sensitive to vibration and shock.

Finally, optical encoders are often used as rotary position sensors, but they also offer significant drawbacks for certain applications. As with resolvers, optical encoders tend to be expensive, thus making them inappropriate for those applications where low cost is a critical design factor. Furthermore, encoders are digital devices, emitting light pulses for each fraction of a rotation of the input shaft. The resolution of an encoder is determined by physical limitations in the number of pulses which can be generated per revolution of the input shaft. Thus, optical encoders are inappropriate for applications wherein a continuous analog signal is required.

In many applications a low cost durable analog sensor is required. In most such cases a non-contact type sensor is preferred wherein the rotating member within the sensor has no physical contact with the stator in order to prevent wear between the rotating parts. In some cases it may be necessary to provide a non-contact rotary sensor wherein there are no electrical connections required for coupling signal to the rotating member. In still other cases it may at be necessary to provide a rotary position sensor wherein the sensor provides a continuous analog signal over a multi-turn range of the input shaft.

Returning to the example of the steering system as described above, it is desirable to provide a rotary position sensor for determining the angular position of the steering column. Since the steering wheel will rotate several times over the full turning range of the front wheels, a position sensor must be capable of determining position over a number turns of the steering wheel. Also, due to the difficulty in coupling electrical signals to a rotatable steering wheel, a position sensor which requires no electrical connections, or at least very few electrical connections to the rotating member is desirable. In a steering mechanism, an additional improvement would be to provide a rotary position sensor which can be housed within an airbag deployment connector known as a clockspring.

SUMMARY OF THE INVENTION

In light of the background given above, one of the main objectives of the present invention is to provide a non-contact type rotary position sensor for measuring the angular position of a rotatable shaft.

A further object of the present invention is to provide a rotary position sensor which generates an analog signal having an amplitude corresponding to the angular position of the input shaft.

Another objective of the present invention is to provide a non-contact position sensor having a minimal number of electrical connections between a rotating member (rotor) and a stationary member (stator).

Still another objective of the present invention is to provide a non-contact rotary position sensor having no electrical connections between the rotor and stator.

Yet another objective of the present invention is to provide a non-contact rotary position sensor wherein the operating sensing range extends over multiple turns of the input rotating shaft.

An additional objective of the present invention is to provide a capacitive rotary position sensor for determining the angular position of a vehicle's steering wheel.

A further objective of the present invention is to provide a capacitive rotary position sensor for determining the angular position of an automotive steering wheel, wherein the position sensor is packaged within an airbag deployment connector known as a clockspring.

All of these objectives, as well as others that will become apparent upon reading the detailed description of the presently preferred embodiments of the invention below, are met by the Capacitive Rotary Position Sensor disclosed herein. The present invention employs the capacitance created between a plurality of stationary conductive plates and a single rotating plate held a fixed distance away to generate an analog voltage signal corresponding to the angular position of the rotary plate. Generally, the rotary position sensor includes a rotor, a stator, an input shaft and a housing.

A first embodiment is configured to generate an analog voltage signal over a single turn of the input shaft. The voltage level of the output signal increases as the angular displacement of the shaft increases, then, as the input shaft passes through 360°, the analog output resets to the 0° voltage level. In this embodiment the stator comprises a fixed insulating disc on which a plurality of at least three wedge shaped conductive plates are arrayed. The wedge shaped plates are all of equal angular extent such that when arrayed together on the stator disc, the plates form a segmented circle on the surface of the disc. A similarly wedge shaped conductive plate attached to a rotatable sensor disc comprises the rotor. The sensor disc is placed parallel to the fixed stator disc with a very narrow gap therebetween. The single plate formed on the sensor disc has the same angular extent than the individual plates on the fixed disc such that regardless of the angular position of the rotor, the conductive plate formed on the sensor disc will overlap at least one or two adjacent stator plates formed on the fixed disc. A polyphase oscillator drives each stator plate with a separate periodic signal, each signal being separated by 2Π/n radians, where n=the number of wedge shaped plates formed on the stator. The rotor plate being placed in close parallel proximity to the stator plates forms a variable capacitance therebetween, with the amount of capacitance between any particular stator plate and the rotor being dependent on the angular position of the rotor plate. The signals driving the stator plates which are overlapped by the rotor plate are capacitively coupled to the rotor such that the signal received on the rotor plate is a composite of the one or two driving the stator plates which are overlapped by the rotor, including a phase shift introduced due to the capacitance between the stator plates and the rotor plates. The signal recovered from the rotor plate is then low pass filtered, hard limited, and input to a phase detector. The 0° signal output from the polyphase oscillator is input to the other input of the phase detector, and an output signal proportional to the phase difference between the two signals corresponds to the angular position of the sensor disc relative to the fixed disc.

A second embodiment is similar to the first, except there are no electrical connections to the rotary disc whatsoever. In the preferred embodiment, an array of four identical wedge shaped conductive plates are formed on the surface of a fixed disc comprising the stator. The rotor comprises a semicircular conductive plate formed on a rotatable sensor disc coupled to the input shaft. The four stator plates are driven by a quadrature squarewave oscillator through a pair of summing networks. The summing networks are arranged such that the 0° and 180° signals are added to one another, as are the 90° and 270° degree signals. Each of the four square wave signals is also connected to one of the four conductive stator plates. The wedge shaped stator plates are arranged in a circle, such that each plate is located 90° away from the two plates immediately adjacent, and 180° from the remaining plate. The quadrature signals connected to each of the stator plates are similarly arranged. The 0° signal is connected to a first plate, hereinafter referred to as the 0° plate, the 90° signal is connected to the 90° plate immediately adjacent the 0° plate, the 270° signal is connected to the 270° plate located immediately adjacent the opposite side of the 0° plate, and the 180° signal is connected to the 180° plate located diametrically opposite the 0° plate.

Generally, the output of the summing networks should be 0V, since the signal being added are each 180° out of phase. However, the semicircular rotor plate placed in close parallel proximity to the stator plates generates a variable capacitance between those stator plates which are overlapped by the rotor plate. This capacitance alters the output of the summing networks. The size of the variable capacitance between the various stator plates is directly related to the position of the semicircular rotor plate. Because the rotor plate only extends over a half circle, the capacitance caused by the rotor will not effect all of the stator plates at any given position. However, of the stator plates which the rotor plate overlaps, the quadrature signals driving the plates will be capacitively coupled in varying degrees between the plates. Due to this capacitive coupling, the signals input to the summing networks are no longer merely opposite phase replications of one another, but composite signals including elements of the adjacent signals coupled between the stator plates. Under these conditions, the output of the summing networks is not 0V but rather the summation of these composite signals. The output of the each summing network is brought to an input of a differential amplifier which effectively subtracts the two signals. The resultant waveform has a phase relationship with the 0° signal generated by the quadrature oscillator which depends on the angular position of the rotor plate. The output of the differential amplifier is low pass filtered in order to generate a clean sinusoidal signal in phase with signal output from the differential amplifier. The resultant sine wave is then input into a hard limiter to restore the signal to a proper square wave. This square wave is then input to a phase detector. The 0° signal from the quadrature oscillator is also input to the phase detector, and the phase detector produces an output signal proportional to the phase difference therebetween. The output of the phase detector produces an analog voltage signal having an amplitude which corresponds to the position of the rotor.

A third embodiment operates on similar principles as the first two embodiments, however, this embodiment senses angular position over several turns of the input shaft. As with the previous embodiment, the stator comprises four conductive plates. However, in this embodiment, rather than being arrayed on the same plane defined by a fixed disc, the four conductive plates are stacked, and the surface of each plate forms an inclined plane which wraps around the input shaft much like a the threads of a screw. However, unlike a screw, the fixed capacitive plates are not attached the input shaft. Rather, the input shaft is free to rotate within central apertures formed within the plates. A separate sensor disc is coupled to the input shaft, and intertwined with the fixed discs. A key structure on the input shaft mates with a keyway on the sensor disc such that the sensor disc rotates with the input shaft, but is free to travel up and down a length of the shaft. As the input shaft is rotated, the sensor disc winds its way between the circular inclined plane defined by the fixed plates. As with the previous embodiment, the fixed plates are driven by a quadrature square wave signal through a pair of summing networks as described previously. The rotating sensor disc alters the capacitance between the fixed discs, thereby altering the signal output from the two summing networks. The output signals from the two summing networks are then input to a differential amplifier, the output signal of which is low pass filtered hard limited and input to a phase detector. The 0° square wave is also input to the phase detector, and the output signal is proportional to phase difference between the two.

BRIEF DESCRIPTION OF THE DRAWINGS

FIG. 1 is an exploded perspective view of a capacitive rotary position sensor according to the present invention;

FIG. 2 is a perspective view of a rotor and stator according to a first embodiment of the invention;

FIG. 3 is a perspective view of a rotor according to a second embodiment of the invention;

FIG. 4 is a schematic representation of a sensing circuitry for a capacitive rotary position sensor according to a first embodiment of the invention;

FIG. 5 is a plan view of the stator and rotor conductive plates according to the first embodiment of the invention;

FIG. 6 is a schematic representation of the sensing circuitry for a capacitive rotary position sensor according to a second embodiment of the invention;

FIG. 7 is a plan view of the stator and rotor conductive plates according to the second embodiment of the invention;

DETAILED DESCRIPTION OF THE PRESENTLY PREFERRED EMBODIMENTS

Figure 8:
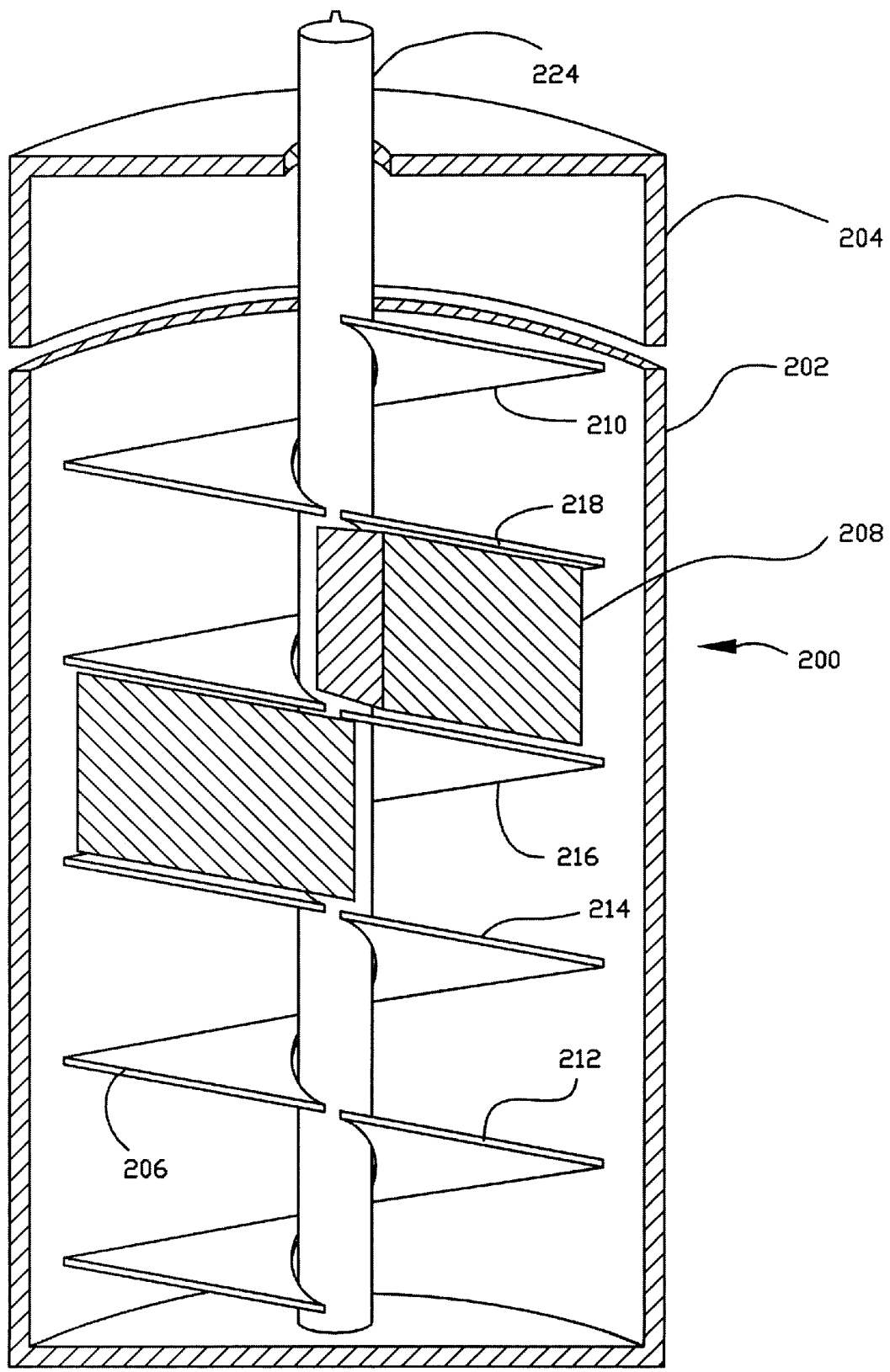
FIG. 8 is a section view of a capacitive rotary position sensor according to a third embodiment of the invention.

The present invention is for a capacitive rotary position sensor for determining the angular position of a rotating shaft. Three separate embodiments are contemplated, with each having particular advantages for different applications.

Turning to FIG. 1, a rotary position sensor 100 is shown including first and second housing members 102, 104, a fixed stator 106, and a rotor 108. For clarity, the stator and rotor are also shown individually in FIG. 2. The stator 106 further comprises an insulating disc 110 formed of a dielectric material such as FR-4. On the surface of the insulating disc 110 are formed a plurality of conductive plates 112, 114, 116, and 118, with each plate being formed in identical wedge shaped fractions of a circle. Each plate is separated by a narrow insulating space 113, such that when taken together, conductive plates 112, 114, 116, and 118 form a circular plane of conductive material with each individual plate forming an electrically isolated segment of the circle. In the preferred embodiment there are four such conductive plates formed on stator disc 110, however with modifications to the drive circuitry the sensor may be constructed with any number of stator conductive plates greater than three.

Turning to the rotor 108, a second insulating disc 120 is also formed of a dielectric material such as FR-4. A single conductive plate, pattern or area 122 is formed on the surface 121 of the rotor disc 120. As with the stator conductive plates, the rotor conductive plate 122 is formed as a wedge shaped fraction of a circle having the same angular width as each of the stator plates. The rotor conductive plate is coated with a dielectric material such that when the stator disc 110 and the rotor disc 120 are placed in parallel alignment with one another, the rotor conductive plate 122 does not create a short circuit between any of the stator plates 112, 114, 116, 118. An input shaft 124 extends from the back of rotor disc 120. The input shaft 124 can be coupled to a rotating mechanical shaft (not shown) such that the rotor disc 120 rotates in unison with the mechanical shaft. A signal lead 123 is connected to rotor conductive plate 122, and provides a raw output position signal from the sensor. The output signal can then be connected to an electrical slip ring (not shown), or some other mechanical system for recovering an electrical signal from a rotating member.

When the rotary position sensor 100 is assembled, stator disc 110 is fixedly attached to the bottom of first housing member 102. Alignment grooves 126 and guide posts ensure that the angular position of the stator remains constant relative to the housing member 102. Rotor disc 120 is placed adjacent to stator disc 110 with the rotor conductive plate 122 facing stator conductive plates 112, 114, 116 and 118 on the surface 117 of the stator disk 110. The two discs physically abut one another such that the spacing between the rotor plate 122 and those stator plates directly opposite is reduced to the mere thickness of the dielectric coating covering the rotor conductive plate 122. Input shaft 124, extending from the back of rotor disc 120, protrudes through an aperture 130 formed in second housing member 104. A support bearing (not shown) may be included within aperture 130 to support the input shaft 124. Second housing member 104 encloses the stator/rotor assembly and locks with the first housing member 102 using locking clips, threads, or any number of other fastening mechanisms which are known in the art. Control circuitry for driving position sensor 100 and sensing the angular position of rotor 108 can be mounted either directly to either of housing members 102, 104, or can be mounted in a separate enclosure remote from the sensor.

Turning to FIGS. 4 and 5, the operation of rotary position sensor 100 will now be described. FIG. 4 shows a schematic representation of the sensing circuitry comprising position sensor 100. Elements described previously such as the stator conductive plates 112, 114, 116, 118, the rotor plate 122, and the input shaft are shown with their previously defined reference numbers. The electronic components comprising the sensor 100 include a quadrature oscillator 132, a low pass filter network 134, a hard limiter 136 and a phase detector 138.

The quadrature oscillator 132 generates a polyphase squarewave signal comprising four identical squarewave signals each separated by a 90° phase shift. Thus, oscillator 132 generates a 0° square wave signal, a 90° square wave signal, a 180° square wave signal, and a 270° square wave signal. It should be noted that the polyphase signal just described including four equally spaced phasor components, is based on the presence of four stator conductive plates 112, 114, 116, and 118. As previously mentioned, the invention may be practiced with any number of stator conductive plates greater than three. In the event that the number of stator conductive plates is selected to be other than four, the total number of phasor components of the polyphase signal output from oscillator 132 must equal the number of stator conductive plates chosen, and the phase angle between the various phasor components must equal 360° divided by the number of stator conductive plates. Returning to the preferred embodiment, however, each of the four square wave signals generated by oscillator 132 is connected to one of the four stator conductive plates 112, 114, 116, and 118. Each square wave signal is connected to its physically corresponding stator conductive plate. In other words, the physical location of a given stator conductive plate corresponds to the phase angle of the square wave signal driving the plate. The 0° signal is connected to a first stator conductive plate 112. The 90° signal is connected to a second stator conductive plate 114 located 90° from the first plate 112. Likewise, the 180° signal is connected to a third stator conductive plate 116 located 180° opposite the first conductive plate 112. Finally, the 270° signal is connected to a fourth stator conductive plate 118 located 270° away from the first conductive plate 112. Obviously, the physical spacing between the various stator conductive plates will be altered when a different number of stator plates are employed.

Stator conductive plates 112, 114, 116, and 118 and rotor conductive plate 122 placed in close parallel proximity to one another form a variable capacitor. Because rotor 108 rotates as input shaft 124 is turned, the area of overlap between the rotor plate 122 and the various stator conductive plates 112, 114, 116, 118 will change with the angular position of the input shaft 124. Since capacitance is determined by, among other things, the physical area between adjacent conductive plates, the rotating motion of rotor conductive plate 122 alters the capacitance between the individual stator conductive plates 112, 114, 116, 118 and the rotor conductive plate 122. At any given angular position of the rotor, the rotor plate 122 will be located opposite a portion of one or two adjacent stator plates. For example, in FIG. 5 which shows the surface of stator disc 110 including stator conductive plates 112, 114, 116, 118 with the rotor conductive plate 122 superimposed thereon, the angular position of the rotor 108 is such that rotor conductive plate 122 overlaps equal portions of the first and second stator conductive plates 112 and 118. Thus, in this position the capacitance established between the first stator conductive plate 112 and the rotor conductive plate 122 is equal to the capacitance created between the second stator conductive plate 118 and the rotor conductive plate 122. The AC drive signals connected to the first and second stator conductive plates 112, 118 will both be capacitively coupled to the rotor plate. Furthermore, the capacitance between the stator conductive plates and the rotor conductive plate will effect a phase shift on the AC signals coupled therebetween. The amount of phase shift applied to each signal will be directly related to the amount of capacitance, and thus the physical area of overlap, between the various stator conductive plates and the rotor conductive plate 122. The resultant signal recovered from the rotor conductive plate 122 will be a composite of the two signals driving the two adjacent stator plates overlapped by the rotor conductive plate 122. In the case where the rotor conductive plate only overlaps a single stator conductive plate, the rotor signal will merely comprise a phase shifted duplicate of the single square wave signal driving the particular stator conductive plate opposite the rotor conductive plate 122. Since the angular relationship between the squarewave signals driving the stator conductive plates corresponds to the physical relationship between the stator conductive plates, the angular position of rotor conductive plate 122 will determine which signals are coupled to the rotor conductive plate 122, and will also determine the phase relationship between the signal recovered from the rotor plate 122 and the signals generated by the oscillator 132. The 0° output signal from oscillator 132 is established as a reference, and the output signal recovered from the rotor conductive plate 122 is compared against the reference. As discussed, the phase angle of the rotor signal will be dependent on the angular position of the rotor. As the rotor conductive plate moves in the direction indicated by arrow A in FIG. 5, the angular position of the rotor is increasing, and the phase difference between the 0° signal and the rotor signal increases as well. The corollary is also true. As the rotor is turned in the opposite direction, the angular position is decreased, and the phase shift between the 0° signal and the rotor signal is likewise diminished. Simply put, the phase difference between the 0° signal and the signal recovered from the rotor conductive plate 122 is proportional to the angular position of the rotor.

The phase difference between the 0° signal and the rotor signal are determined as follows. Output lead 123 recovers the rotor signal, and connects the signal to external circuitry via a slip ring assembly or some other mechanical means.

Because the rotor signal is generally a composite of more than one square wave, it may be difficult to determine the exact phase relationship between the rotor signal and the 0° square wave output from the quadrature oscillator 132. Therefore, the rotor signal is input to low pass filter 134 which produces a single sinusoidal waveform having the same frequency and being in phase with the recovered rotor signal. The filtered sine wave signal provides definite zero crossings from which the phase angle of the signal can be more readily determined. The filtered sine wave is then input to hard limiter 136 which produces a clean square wave signal having the same phase angle and frequency as the filtered sine wave. This square wave signal is then input to phase detector 138 along with the 0° signal from oscillator 132. Phase detector 138 produces an analog voltage signal proportional to the phase difference between the 0° signal and the reconstructed square wave signal recovered from the rotor. Since the phase angle of the reconstructed square wave is directly related to the angular position of the rotor 108 and input shaft 124, the voltage output of phase detector 138 provides a direct indication of the angular position of the rotary input shaft 124.

Returning to FIG. 1, a second embodiment of the invention is physically similar to the first embodiment previously disclosed. Comparable components of the second embodiment shown in FIG. 1 include first and second housing members 102, 104, stator 106, and input shaft 124. These components are identical to those described in the first embodiment. The most significant physical difference between the position sensor of the first embodiment, and that of the second relates to the rotor conductive plate formed on the surface of the rotor. In the second embodiment, the rotor 108 of FIG. 2 is replaced with the rotor 108' shown in FIG. 3. Rotor 108' includes a circular disc 120', an input shaft 124', and a conductive plate 122' on the surface 121'. Rather than having the same shape as the stator conductive plates 112, 114, 116, 118, and being electrically connected to the sensing circuitry as in the first embodiment, the rotor conductive plate 122' of the second embodiment is formed as a semicircular plate, and has no electrical connections to the remaining components of the sensor. Another important distinction over the first embodiment is that whereas the first embodiment may be practiced with any number of stator conductive plates greater than three, the second embodiment requires exactly four equally shaped stator conductive plates arranged around the face of stator disc 110, as shown in FIGS. 1 and 2.

FIG. 6 provides a schematic representation of the rotary position sensor 100' of the second embodiment. Many components of the sensor circuitry are the same as the previous embodiment, and are labeled using the same reference numbers. These include quadrature oscillator 132, low pass filter 134, hard limiter 136, and phase detector 138. In addition to these components, sensor 100' includes additional components which add to the complexity of the drive circuitry which supplies electrical signals to the stator conductive plates. As with the first embodiment, quadrature oscillator 132 generates a polyphase signal comprising four identical squarewave signals having phase intervals of 90°. However, rather than being connected directly to the stator conductive plates 112, 114, 116, 118 the squarewave signals are input to a pair of summing networks. The first summing network comprises resistors $R_1$, $R_2$, $R_5$, and $R_6$ which sum the first, 0° signal, and the third, 180° signal. The second summing network comprises resistors $R_3$, $R_4$, $R_7$, and $R_8$ which sum the second, 90° signal, and the fourth, 270° signal. Node A established by the junction of resistors $R_2$ and $R_6$ represents the output of the first summing network, and node B established by the junction of resistors $R_4$ and $R_8$ represents the output of the second summing network. Generally, the sum of two identical signals 180° out of phase with one another can be expected to be a DC signal of 0V. This does not occur with the present summing networks, however, due to variable capacitance introduced by the overlapping parallel arrangement of stator and rotor conductive plates 112, 114, 116, 118, and 122'.

As noted, node A, the summing point of the 0° and 180° signals, lies at the junction between resistors $R_2$ and $R_6$. To reach this point, the 0° signal must pass through resistors $R_1$ and $R_2$, the junction of which is connected to the 0° stator conductive plate 112. Similarly, to reach node A the 180° signal must pass through resistors $R_5$ and $R_6$, the junction of which is connected to the 180° stator conductive plate 116. Node B, the summing point of the 90° and 270° signals, lies at the junction between resistor $R_4$ and $R_8$. To reach node B, the 90° signal must pass through resisters $R_3$ and $R_4$, the junction of which is connected to the 90° stator conductive plate 114. Similarly, in order to reach node B the 270° signal must pass through resistors $R_7$ and $R_8$, the junction of which is connected to the 270° stator conductive plate 118. As will be discussed in more detail below, the interaction between the stator conductive plates 112, 114, 116, 118 with rotor conductive plate 122' generates a variable capacitance between the various stator conductive plates which alters the summing network output signals present at nodes A and B.

When the rotor is placed parallel to the stator, rotor conductive plate 122' is held immediately opposite at least a portion of two or three adjacent stator conductive plates. This overlapping of parallel conductive plates creates capacitance between the various plates. Because the rotor conductive plate 122' will always be at least partially opposite more than one stator conductive plate, the rotor conductive plate 122' actually develops capacitance between stator conductive plates located adjacent one another. Obviously, the amount of capacitance between particular stator conductive plates will be dependent on the angular position of the rotor disc 120', and the resultant area of physical overlap between the rotor conductive plate 122' and the adjacent stator conductive plates overlapped thereby. As a result of this capacitance, the AC signals output from quadrature oscillator 132 will be capacitively coupled between the various stator conductive plates overlapped by rotor conductive plate 122'.

Each adjacent stator conductive plate is driven alternately through one or the other of the first and second summing networks. For example, the 0° stator conductive plate 112 is driven through the first summing network comprising resistors $R_1$, $R_2$, $R_5$ and $R_6$, and the 90° stator conductive plate 114 and the 270° stator conductive plate 118 immediately adjacent the 0° stator conductive plate 112 are each driven through the second summing network comprising resistors $R_3$, $R_4$, $R_7$, and $R_8$. The significance of this fact is that the AC signals capacitively coupled between adjacent stator conductive plates are actually coupled between the various summing networks. This coupling of signals from one summing network to the other affects the output signals of both networks.

As an example, consider FIG. 7 where the rotor conductive plate 122' is shown overlapping all of 0° stator conductive plate 112, and one half of both 90° and 270° stator conductive plates 114, 118. With this orientation, the 0° component of the quadrature signal output from oscillator 132 will be coupled to both the 90° and 270° stator conductive plates 114, 118. Since the area of overlap between the rotor conductive plate 122' and the 90° stator conductive plate 114 equals the area of overlap between the rotor conductive plate 122' and the 270° stator conductive plate 118, the capacitance between the 0° stator conductive plate 112 and both the 90° stator conductive plate 114 and the 270° stator conductive plate 118 will be the same. Since the capacitance between the plates is equal, the signals coupled to the 90° and 270° plates will be equal as well. The capacitive coupling between the 0° stator conductive plate 112 and the 90° and 270° stator conductive plates 114, 118 effects the output voltage of both summing networks. As the rotor 108' is turned, the capacitance between the various stator conductive plates will change, and therefore the signal coupled between the various stator conductive plates will be altered, and the output signals of the two summing networks present at nodes A and B will be altered as well.

With the rotor 108 positioned as shown in FIG. 7, the portion of the 0° signal which is coupled to the 90° and 270° stator conductive plates reduces the 0° signal available to the first summing network. Therefore, the output signal present at node A will not be the summation of two equal and opposite phase signals, but rather the summation of a first reduced square wave signal and a second stronger signal 180° out of phase with the first signal. When the two signals are added together, the stronger 180° predominates and the resultant signal present at node A will be in phase with the 180° signal, but will be reduced by the amount of the 0° signal remaining to the first summing network.

Similarly, each input signal to the second summing network will have an equal, phase shifted component of the 0° signal added thereto. The 90° and 270° signals when added together will cancel one another, and the remaining output signal of the second summing network will be the summation of the two phase shifted components of the 0° signal coupled to the 90° and 270° stator conductive plates 114, 118.

Turning back to FIG. 6, summing network output nodes A and B are input to a differential amplifier 140. The differential amplifier effectively subtracts the two output signals from the summing networks, generating a composite signal having a variable phase relationship with the input quadrature signals generated by oscillator 132 which is dependent on the position of the rotor 108'. As with the first embodiment, the resultant signal output from differential amplifier 240 is low pass filtered via low pass filter 134, and hard limited via hard limiter 136 to generate a clean squarewave signal which can be compared against the input signal generated by quadrature oscillator 132. The square wave output of hard limiter 136 is input to phase detector 138, along with the 0° signal output from the quadrature oscillator 132. The phase detector measures the phase angle difference between the 0° signal and the composite signal output from differential amplifier, and outputs an analog voltage signal proportional to the phase angle between the two signals. Since the phase angle difference between the 0° signal output from oscillator 132 and the composite signal output from the differential amplifier is directly related to the angular position of the rotor, the output voltage of the phase detector will similarly be proportional to the angular rotation of the rotor, thus providing an indication of angular position of the input shaft.

Figure 9:
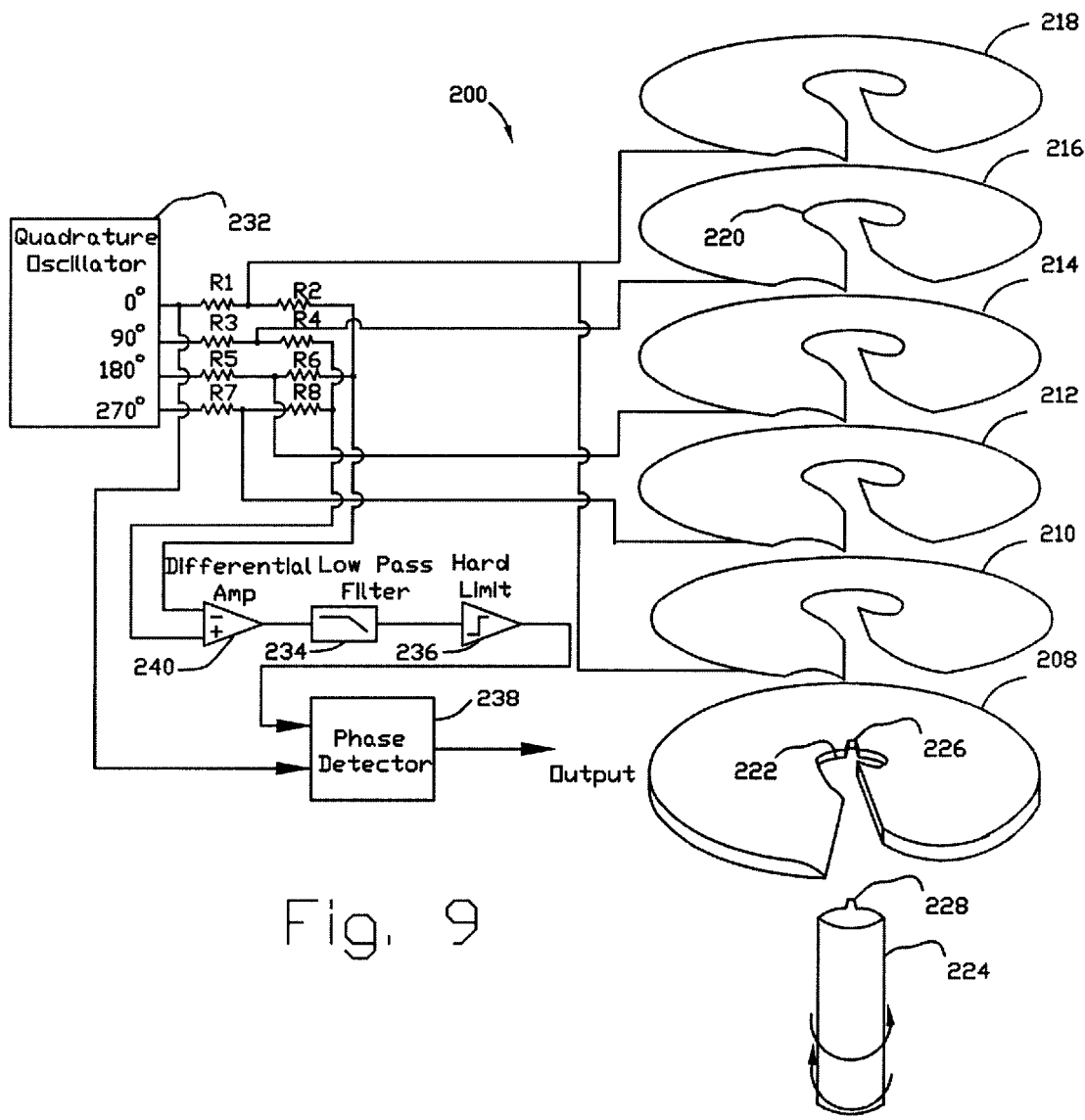
FIG. 9 is a schematic representation of the sensing circuitry for a capacitive rotary position sensor according to the third embodiment of the invention.

A third embodiment of a position sensor 200 is shown in FIGS. 8 and 9. The operative principles behind this third embodiment are the same as those of the previous embodiment. In fact, the electrical circuitry driving position sensor 200 is identical to that driving the position sensor of the previous embodiment. Physically, however, there are significant differences with the construction of sensor 200. FIG. 8 shows a cross section of the major components of sensor 200, including first and second housing members 202, 204, a segmented stator 206, a rotor 208 and an input shaft 224. The major difference between sensor 200 and the previous embodiments is that the stator 206 and rotor 208 are configured and arranged to sense position over multiple revolutions of the input shaft.

Stator 206 comprises five individual stator plates 210, 212, 214, 216, 218 formed of a conductive material such as copper. Unlike the previous embodiments, stator plates 210, 212, 214, 216, 218 are not arranged horizontally on the surface of a disc, but rather are stacked vertically one on top of another. Each stator plate includes a center aperture which allows the input shaft 224 to be inserted through the center of the entire stator assembly 206, and rotate freely therein. Also, rather than being flat, each stator plate is formed as an angularly inclined plane whose height increases as the plate is traversed in a circular direction. When stacked vertically and spaced properly, the five stator conductive plates 210, 212, 214, 216, 218 form a continuous helix much like the threads of a screw which wraps around the input shaft 224.

The rotor 208 comprises a single insulated conductive disc in the form of a near 360° helical arc. The rotor 208 includes a central aperture 222 for receiving the input shaft 224. The central aperture for receiving the input shaft 124. Aperture 222 includes a key way 226, or some other interference type structure such a squared opening, which cooperates with a key 228 or some corresponding structure formed on the input shaft to insure that rotational motion of the input shaft 224 is accurately and immediately transmitted to the rotor. The keyed input shaft 224 forces the rotor 208 to rigidly follow the angular rotation of the input shaft, but the rotor 208 is not fixedly attached to the input shaft 224. Rather, the rotor is free to travel up and down the portion of the input shaft which is contained within the first and second housing members 202, 204. Rotor 208 is intertwined with the stator conductive plates 210, 212, 214, 216, 218 such that as the input shaft 224 rotates back and forth in each direction, the rotor plate 208 winds its way up and down the vertical helix defined by the vertically stacked stator conductive plates.

In sensing position, sensor 200 operates in much the same manner as the position sensor of the previous embodiment. As the rotor 208 winds its way around the helical stator conductive plates 210, 212, 214, 216, 218, it will always be adjacent to at least a portion of two or three consecutive stator plates. Electrically, each stator plate is driven by one component of the polyphase signal output by quadrature oscillator 232, and the rotor 208 capacitively couples the various signals between the various stator conductive plates adjacent the rotor 208. As with the previous embodiment, the phase angle of the signals coupled between the various stator plates will depend on the area of overlap, and therefore the capacitance, between the particular stator plates and the rotor plate.

The circuitry for determining the position of the rotor is identical with that of the previous embodiment. Oscillator 232 outputs a quadrature signal driving first and second summing networks. The first summing network comprises resistors $R_1$, $R_2$, $R_5$ and $R_6$, with the output Node A being formed by the junction of resistors $R_2$ and $R_6$. The second summing network comprises resistors $R_3$, $R_4$, $R_7$ and $R_8$, with the output Node B being formed by the junction of resistors $R_4$ and $R_8$. The junction of $R_1$ and $R_2$ is connected to 0° stator plates 210 and 212 which are physically located at top and bottom of the helix defined by the stator plates 210, 212, 214, 216, and 218. Two 0° stator plates 210, 212 are required, so that position can be determined over the full rotational range of sensor 200. With this arrangement, the position of input shaft 224 can be determined when the rotor is located at both ends of the stator helix. In other words, with both the top and bottom stator conductive plates 210, 212 being driven by the 0° signal, the position of input shaft 224 can be accurately determined when the rotor plate 208 is positioned at the lower end of travel, adjacent the lower 0° stator conductive plate 212 and the 90° stator conductive plate 214, and at the upper end of travel when the rotor plate 208 is positioned at the upper end of travel adjacent the 270° stator conductive plate 218, and the upper 0° stator conductive plate 210.

As with the previous embodiment, the AC signals capacitively coupled between the various stator conductive plates effect the output signals of the two summing networks which drive the stator conductive plates. The summing network output signals present at nodes A and B are input to differential amplifier 240 which effectively subtracts the two signals. The output of the differential amplifier is then input to low pass filter 234, hard limiter 236, then phase detector 238. The 0° signal from oscillator 232 is also input to phase detector 238. The phase detector outputs an analog voltage signal proportional to the phase difference between the two signals. Since the phase difference between the 0° signal and that output from differential amplifier determined by the position of rotor 208 relative to the various stator conductive plates 210, 212, 214, 216, 218 the analog voltage out of phase detector 238 can be used to determine the angular position of the input shaft 224. Further more, since four revolutions of input shaft 224 are required for rotor 208 to travel from the bottom to the top of the helix defined by stator conductive plates 210, 212, 214, 216, 218, sensor 200 allows position sensing over a four turns range of input shaft 224.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A rotary position sensor comprising:
   a single stator;
   a single rotor;
   a first surface formed on one of either the single rotor and the single stator, the first surface including a plurality of conductive plates formed in a circular arrangement thereon;
   a second surface formed on the other of the single rotor and the single stator, the second surface including a single conductive plate formed thereon;
   a signal generator providing a polyphase signal driving each conductive plate of the plurality of conductive plates with a separate component thereof;
   the single stator and single rotor being immediately juxtaposed such that the first surface is oriented substantially parallel to the second surface and the single rotor is able to rotate independently from the single stator, and wherein the plurality of conductive plates face the single conductive plate;
   an input shaft attached to the single rotor such that rotary motion of the input shaft alters the position of the single conductive plate relative to each of the plurality of conductive plates, thereby forming a variable capacitance between each conductive plate of the plurality of conductive plates and the single conductive plate; and
   a phase detector having a first input electrically coupled to the single conductive plate and a second input electrically coupled to an intermediate signal output of the signal generator, the phase detector determining phase relationship between the separate components of the polyphase signal driving the plurality of conductive plates and an intermediate signal, the polyphase signal and the intermediate signal capacitively coupled between the plurality of conductive plates and the single conductive plate.

2. The rotary position sensor of claim 1 wherein the polyphase signal output by the signal generator comprises a number of component signals equal to the number of conductive plates comprising the plurality of conductive plates formed on the first surface.

3. The rotary position sensor of claim 2 wherein the component signals comprising the polyphase signal are separated by a phase angle equal to 360° divided the number of conductive plates comprising the plurality of conductive plates formed on the first surface.

4. The rotary position sensor of claim 3 wherein the single conductive plate formed on a second surface has substantially the same shape as the individual conductive plates comprising the plurality of conductive plates formed on the first surface.

5. The rotary position sensor of claim 3 wherein the component signals comprising the polyphase signal generated by the signal generator are connected directly to the individual conductive plates comprising the plurality of conductive plates formed on the first surface.

6. The rotary position sensor of claim 5 wherein the components of the polyphase signal are sequentially connected to adjacent conductive plates comprising the plurality of conductive plates formed on the first surface.

7. The rotary position sensor of claim 3 further comprising an output lead connected directly to the single conductive plate formed on the second surface.

8. The rotary position sensor of claim 7 further comprising a low pass filter network for filtering the intermediate signal present on the output lead.

9. The rotary position sensor of claim 8 further comprising a hard limiter for converting a sinusoidal signal output from the low pass filter into a squarewave signal having the same frequency and phase angle as the intermediate signal.

10. The rotary position sensor of claim 9 wherein the phase detector generates an analog voltage signal having a voltage level corresponding to the phase angle difference between the squarewave signal output from the hard limiter, and one component of the polyphase signal output by the signal generator.

11. The rotary position sensor of claim 1 wherein the polyphase signal output by the signal generator comprises four component signals, each electrically separated by 90° and arbitrarily referenced 0°, 90°, 180°, and 270° signals, and wherein the plurality of conductive plates formed on the first surface comprises four equally shaped conductive plates.

12. The rotary position sensor of claim 11 wherein the single conductive plate formed on the second surface is formed in the shape of a semicircle.

13. The rotary position sensor of claim 11 wherein the 0° and 180° signals are input to a first summing network, and the 90° and 270° signals are input to a second summing network.

14. The rotary position sensor of claim 13 wherein the first summing network comprises first, second, fifth, and sixth resistors connected in series between the 0° and 180° signals, the first resistor being connected to the 0° signal and the fifth resistor being connected to the 180° signal, and the junction of the second and sixth resistors comprising the output of the first summing network.

15. The rotary position sensor of claim 14 wherein the second summing network comprises third, fourth, seventh, and eighth resistors connected in series between the 90° and 270° signals, the third resistor being connected to the 90° signal, and the fifth resistor being connected to the 270° signal, and the junction of the fourth and eighth resistors comprising the output of the second summing network.

16. The rotary position sensor of claim 15 wherein the junction between the first and second resistor is connected to the first of the four conductive plates formed on the first surface, the junction between the third and fourth resistors is connected to the second of the four conductive plates located 90° from the first plate, the junction of the fifth and sixth resistors is connected to the third of the four conductive plates located 180° from the first plate, and the junction between the seventh and eighth resistors is connected to the fourth of the four conductive plates located 270° from the first plate.

17. The rotary position sensor of claim 16 further comprising a differential amplifier, the output of the first summing network being connected to a first input of the differential amplifier, and the output of the second summing network being connected to a second input of the differential amplifier.

18. The rotary position sensor of claim 17 further comprising a low pass filter network for filtering an output signal from the differential amplifier.

19. The rotary position sensor of claim 18 further comprising a hard limiter for converting a sinusoidal signal output from the low pass filter network into a squarewave signal.

20. The rotary position sensor of claim 19 wherein the phase detector generates an analog voltage signal proportional to the phase angle between the 0° signal and the squarewave signal output from the hard limiter.

21. The rotary position sensor of claim 13 wherein:

the first summing network comprises first, second, fifth, and sixth resistors connected in series between the first and third components of the quadrature signal, the first resistor being connected to the first quadrature signal component and the fifth resistor connected to the third quadrature signal component, the junction of the second and sixth resistors comprising the output of the first summing network, the junction between the first and second resistor connected to the first stator plate, and the junction between the fifth and sixth resistor connected to the third stator plate located 180° from the first stator plate;

the second summing network comprises third, fourth, seventh, and eighth resistors connected in series between the second and fourth components of the quadrature signal, the third resistor being connected to the second quadrature signal component, he fifth resistor connected to the fourth quadrature signal component, the junction of the fourth and eighth resistors comprising the output of the second summing network, the junction between the third and fourth resistors connected to the second stator plate located 90° from the first stator plate, and the junction between the seventh and eighth resistors connected to the fourth stator plate located 180° from the second stator plate.

22. The rotary position sensor of claim 21 wherein the signal recovery circuitry further comprises a low pass filter connected to the output of the differential amplifier, and a hard limiter for reconstructing a squarewave signal from the sinusoidal output of the lowpass filter, the output of the hard limiter being input to the phase detector.

23. The rotary position sensor as defined in claim 1, wherein the single conductive plate includes a thin layer of dielectric material disposed thereupon.

* * * * *